US008457363B2

(12) United States Patent
Sung et al.

(10) Patent No.: US 8,457,363 B2
(45) Date of Patent: Jun. 4, 2013

(54) APPARATUS AND METHOD FOR DETECTING EYES

(75) Inventors: Younghun Sung, Gyeonggi-do (KR); Jaywoo Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1120 days.

(21) Appl. No.: 11/132,211

(22) Filed: May 19, 2005

(65) Prior Publication Data

US 2005/0259873 A1    Nov. 24, 2005

(30) Foreign Application Priority Data

May 21, 2004    (KR) ........................ 10-2004-0036390

(51) Int. Cl.
    *G06K 9/00*      (2006.01)
(52) U.S. Cl.
    USPC ........... 382/117; 382/131; 382/190; 382/195; 382/218; 382/128
(58) Field of Classification Search
    USPC ................. 382/118, 115, 156, 160, 172, 190, 382/206, 226, 278, 293, 1, 2, 48, 6, 162, 382/224, 225, 284, 272, 276, 199, 203, 173, 382/195, 164; 348/14.03, 5.52, 5.53, 5.83, 348/5.84
See application file for complete search history.

(56) References Cited

U.S. PATENT DOCUMENTS

| | | | |
|---|---|---|---|
| 6,804,391 B1 * | 10/2004 | Blake et al. ................. | 382/159 |
| 6,885,760 B2 * | 4/2005 | Yamada et al. ............ | 382/118 |
| 6,961,446 B2 * | 11/2005 | Imagawa et al. ........... | 382/103 |
| 6,990,217 B1 * | 1/2006 | Moghaddam et al. ....... | 382/118 |
| 7,035,456 B2 * | 4/2006 | Lestideau .................... | 382/164 |
| 7,236,626 B2 * | 6/2007 | Blake et al. ................. | 382/159 |
| 7,266,225 B2 * | 9/2007 | Mariani et al. .............. | 382/118 |
| 7,454,342 B2 * | 11/2008 | Nefian et al. ................ | 704/256 |
| 2002/0031262 A1 * | 3/2002 | Imagawa et al. ........... | 382/190 |
| 2002/0136450 A1 * | 9/2002 | Chen et al. .................. | 382/165 |

(Continued)

FOREIGN PATENT DOCUMENTS

| | | |
|---|---|---|
| WO | WO 03/079902 A | * 10/2003 |
| WO | WO 03/079902 A1 | * 10/2003 |
| WO | WO 03079902 A1 | * 10/2003 |

OTHER PUBLICATIONS

Yao-Hong Tasi and Yea-Shuan Huang "Fast Hierarchical Face Detection" 2003 IEEE, p. III-301-III-304.*

(Continued)

*Primary Examiner* — Mekonen Bekele
(74) *Attorney, Agent, or Firm* — Staas & Halsey LLP (57) ABSTRACT

An apparatus for and a method of detecting eyes from an input face image. The apparatus for detecting eyes includes: an eye candidate detector which divides an input face image into left and right images and detects at least one eye candidate from limited image regions of the left and right images; an eye candidate evaluator which evaluates the eye candidates by evaluating each combination of the eye candidates using geometric information as to the eye candidates to filter out eye candidates that cannot be eyes; a learning database which stores a plurality of face images in which positions of eyes are arranged and a plurality of face images which do not include eyes or in which positions of eyes are not arranged; and an eye candidate verifier which verifies the eye candidates with reference to the learning database and outputs an eye detection result signal.

11 Claims, 5 Drawing Sheets

U.S. PATENT DOCUMENTS

| | | | | |
|---|---|---|---|---|
| 2003/0202704 | A1* | 10/2003 | Moghaddam et al. | 382/224 |
| 2004/0005083 | A1* | 1/2004 | Fujimura et al. | 382/103 |
| 2005/0008201 | A1* | 1/2005 | Lee et al. | 382/117 |
| 2005/0094849 | A1* | 5/2005 | Sung et al. | 382/103 |
| 2007/0116379 | A1* | 5/2007 | Corcoran et al. | 382/275 |

OTHER PUBLICATIONS

Jennifer Huang1, Volker Blanz, and Bernd Heisele"Face Recognition Using Component-Based SVM Classification and Morphable Models" LNCS 2388, pp. 334-341, 2002.*

Yao-Hong Tasi and Yea-Shuan Huang "Fast Hierarchical Face Detection" 2003 IEEE, p. 111-301-111-304.*

Yao-Hong Tasi and Yea-Shuan Huang "Fast Hierarchical Face Detection" 2003 IEEE, p. 11 1-301 to 11 1-304.*

Jennifer Huang, Volker Blanz, and Bernd Heisele"Face Recognition Using Component-Based SVM Classification and Morphable Models" LNCS 2388, pp. 334-341, 2002.*

Yao-Hong Tasi and Yea-Shuan Huang "Fast Hierarchical Face Detection" 2003 IEEE, p. 111-301 to 111-304.*

Jennifer Huang, Volker Blanz, and Bernd Heisele"Face Recognition Using Component-Based SVM Classification and Morphable Models" LNCS 2388, pp. 334-341, YEAR2002.*

Moghaddam et al., "Learning Gender with Support Faces", IEEE, vol. 24., No. 5, May 2002, pp. 707-711.*

* cited by examiner

APPARATUS AND METHOD FOR DETECTING EYES

CROSS-REFERENCE TO RELATED APPLICATION

This application claims the priority of Korean Patent Application No. 10-2004-0036390, filed on May 21, 2004, in the Korean Intellectual Property Office, the disclosure of which is incorporated herein by reference.

BACKGROUND OF THE INVENTION

1. Field of the Invention

The present invention relates to a system for recognizing a face, and more particularly, to an apparatus and method for accurately detecting eyes from an input face image.

2. Description of Related Art

Face recognition systems identify one or more humans' faces in a still or moving picture using a face database. Such a face recognition system extracts only a face region to be recognized from an input face image using a scanner in a case of a still picture or using a charge coupled device (CCD) camera installed for security in a bank or a personal computer (PC) camera mainly used in Internet visual chatting in a case of a moving picture and extracts the major characteristics of the face region. For example, the face recognition system extracts the characteristics such as eyes, nose, mouth, counter of a face and compares the extracted characteristics with the characteristics stored in a face database to recognize the face.

A process of detecting face components or accurate positions of the characteristics of a face from an extracted face candidate region is required in order to input an extracted face candidate image to the face recognition system. In other words, in order to compare an input image with a model, position extraction and size normalized processes for compensating differences in size, rotation direction, and position between a face image extracted from the input image and a face image of a model template are required as essential previously-completed processes for improving recognition and matching performances. Most face recognition systems use eye regions or the central regions of the pupils as face elements for arrangement and normalization processes. This is because the characteristics of the eye regions of the face elements do not change even though the size, expression, and posture of the face image and illumination vary. Thus, it is very important to exactly detect the positions of eyes.

U.S. Pat. No. 5,293,427, entitled "Eye position detecting system and method therefore," discloses a technique for detecting eye position by a difference between an infrared image and a binarized general image using an infrared strobe. However, in this technique, the infrared strobe is required, and when a face is presented for detection wearing eyeglasses, afterimages are formed on the lenses of eyeglass.

Also, in a conventional eye detecting method, eyes are detected by performing a morphology operation, a histogram analysis, or the like with respect to the entire face image. Thus, the conventional eye detecting method is sensitive to a variation of illumination. Moreover, both eyes cannot be accurately detected at the same time.

BRIEF SUMMARY

An aspect of the present invention provides an apparatus and method for accurately detecting eyes by dividing an input face image into left and right images, detecting eye candidates from limited image regions of the left and right images, evaluating the detected eye candidates using geometric information, and verifying the eye candidates using a support vector machine (SVM) algorithm.

According to an aspect of the present invention, there is provided an apparatus for detecting eyes including: an eye candidate detector which divides an input face image into left and right images and detects at least one eye candidate from limited image regions of the left and right images; an eye candidate evaluator which evaluates the eye candidates by evaluating each combination of the eye candidates using geometric information as to the eye candidates to filter out eye candidates that cannot be eyes; a learning database which stores a plurality of face images in which positions of eyes are arranged and a plurality of face images which do not include eyes or in which positions of eyes are not arranged; and an eye candidate verifier which verifies the eye candidates with reference to the learning database and outputs an eye detection result signal.

The eye candidate verifier may include: a support vector machine classifier which receives the face image comprising the eye candidates and calculates an output value using a support vector machine algorithm; a maximum output value selector which selects a maximum output value among the calculated output values; and an eye determiner which, when the maximum output value is equal to or larger than a predetermined threshold value, determines that the detection of the eyes has succeeded, or when the maximum output value is less than the predetermined threshold value, determines that the detection of the eyes has failed.

According to another aspect of the present invention, there is provided a method of detecting eyes, including: dividing an input face image into left and right images; detecting at least one eye candidate from limited image regions of the left and right images; evaluating the eye candidates by evaluating each combination of the eye candidates using geometric information as to the eye candidates to filter out eye candidates that cannot be eyes; and verifying the eye candidates with reference to a learning database storing a plurality of face images in which positions of eyes are arranged and a plurality of face images which do not include eyes or in which positions of eyes are not arranged and outputting an eye detection result signal.

Before the input face image is divided into left and right images, the method may further include: adjusting size of the input face image and normalizing a histogram.

According to other aspects of the present invention, there are provided computer-readable storage media encoded with processing instructions for causing a processor to perform the above-described methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 1:
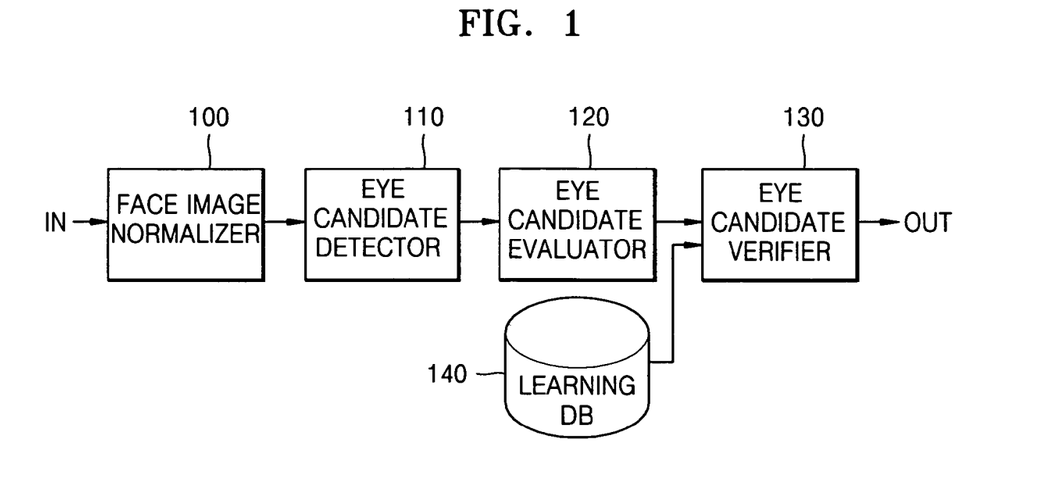
FIG. 1 is a block diagram of an eye detecting apparatus, according to an embodiment of the present invention.

FIG. 1 is a block diagram of an eye detecting apparatus, according to an embodiment of the present invention. Referring to FIG. 1, the eye detecting apparatus includes a face image normalizer 100, an eye candidate detector 110, an eye candidate evaluator 120, an eye candidate verifier 130, and a learning database (DB) 140.

The face image normalizer 100 normalizes size and lightness values of an input face image IN. In the present embodiment, the size of the input face image IN is adjusted to 80×96 pixels. A histogram is adjusted to make the biased or non-uniform distribution of the lightness value of a face image uniform.

The eye candidate detector 110 divides the input face image IN into left and right images and detects at least one eye candidate from each of the left and right images. Here, eye candidate detection is achieved by binarizing the face image based on a threshold value $Th_{binary}$, morphology filtering the binarized face image, and detecting an outline of the face image.

The eye candidate evaluator 120 evaluates eye candidates with respect to each of combinations of the eye candidates by evaluating each possible combination of the eye combinations using geometric information as to the eye candidates, such as distances, slopes, and the like among the eye candidates, and filters the eye candidates that cannot be eyes so as to selectively reduce the number of eye candidates.

The eye candidate verifier 130 verifies the eye candidates with reference to the learning DB 140 and outputs an eye detection result signal OUT. In the present embodiment, the eye candidates are verified using an SVM algorithm.

Figure 2:
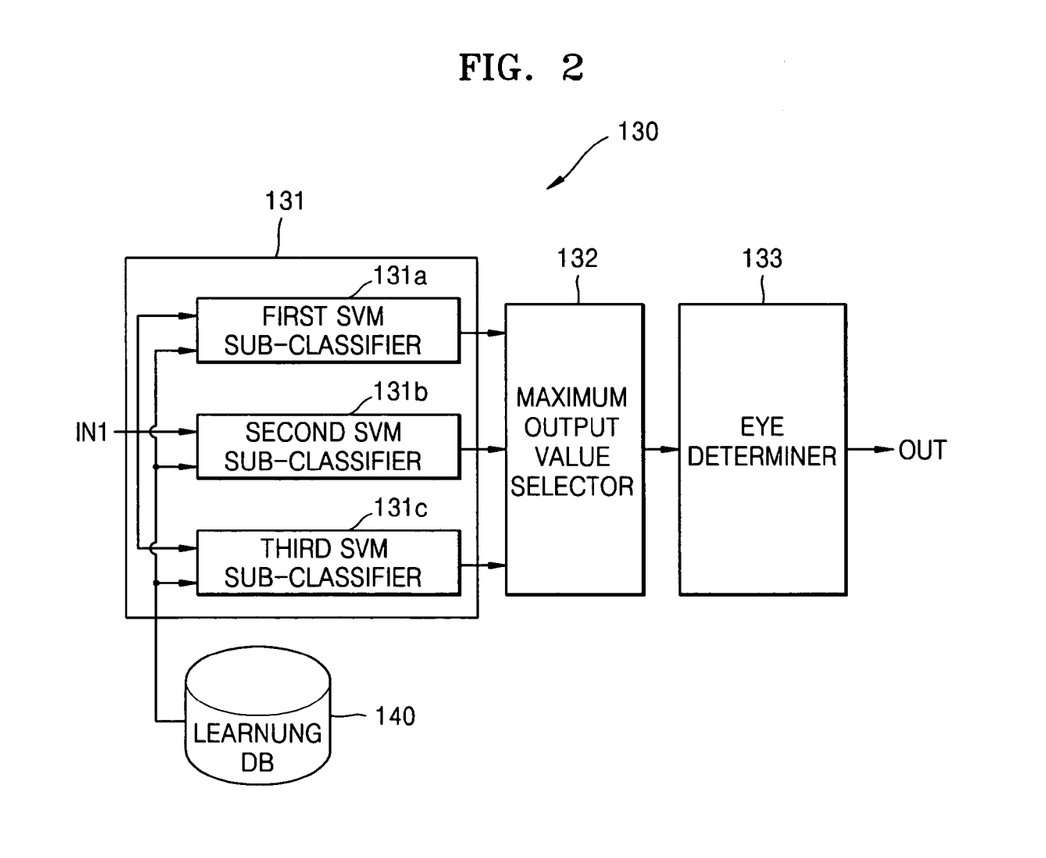
FIG. 2 is a block diagram of an eye candidate verifier of FIG. 1.

FIG. 2 is a block diagram of the eye candidate verifier 130 of FIG. 1. Referring to FIG. 2, the eye candidate verifier 130 includes support vector machine (SVM) classifier 131, a maximum output value selector 132, and an eye determiner 133.

The SVM classifier 131 includes a first SVM sub-classifier 131a for a general face, a second SVM sub-classifier 131b for a face wearing eyeglasses, and a third SVM sub-classifier 131c for a face with long hair. Each of the first, second, and third SVM sub-classifiers 131a, 131b, and 131c receives an image IN1 including the eye candidate selected by the eye candidate evaluator 120 and calculates an output value with reference to the learning DB 140.

The maximum output value selector 132 selects a maximum value among the output values of the first, second, and third SVM sub-classifiers 131a, 131b, and 131c. The eye determiner 133 determines whether the maximum value is equal to or larger than a threshold value $Th_{eye}$ to output an eye detection success or failure result signal OUT.

Figure 3A:
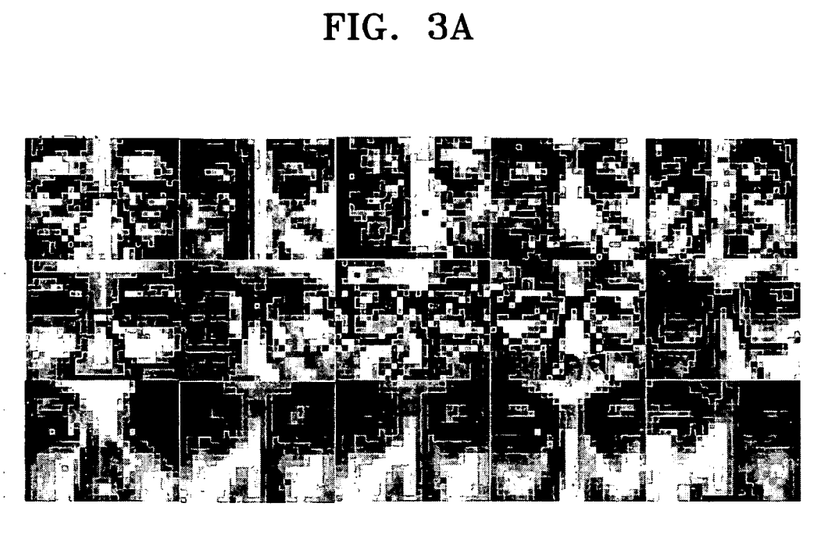
FIG. 3A is a view for showing face images in which the positions of eyes are accurately arranged.
Figure 3B:
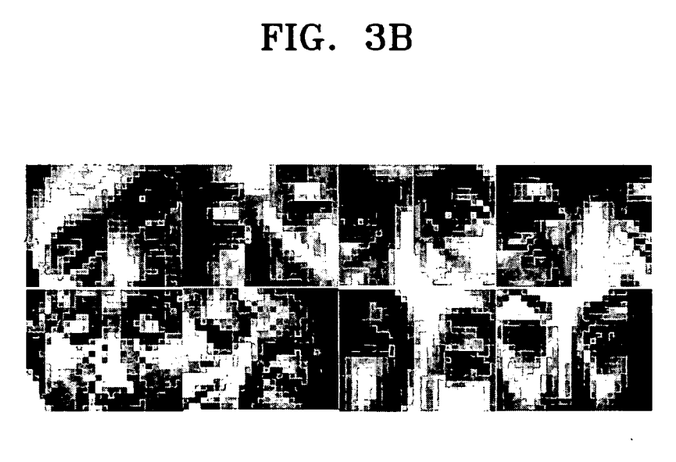
FIG. 3B is a view for showing face images in which the positions of eyes are not accurately arranged.

Through learning of a face image including a large number of 25×20 pixels, the learning DB 140 stores a face in which the positions of eyes are accurately arranged as class 1 and a face which does not include eyes or in which the positions of eyes are not accurately arranged as class −1. Face images determined as class 1 are shown in FIG. 3A, and face images determined as class −1 are shown in FIG. 3B.

Figure 4:
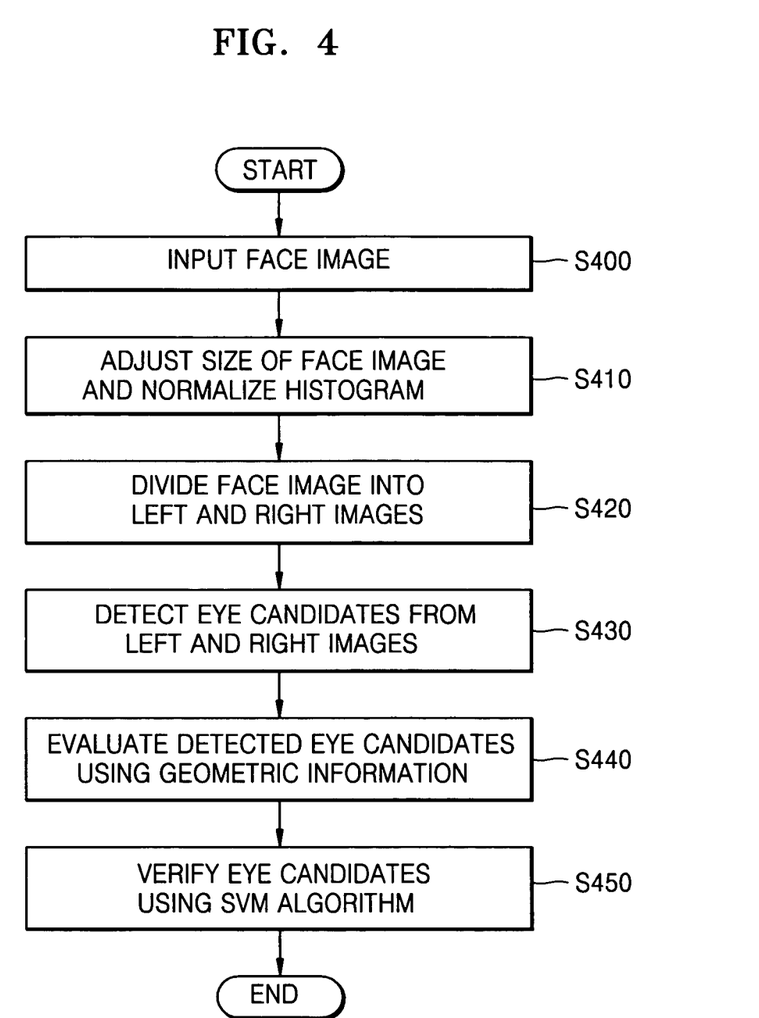
FIG. 4 is a flowchart for explaining an eye detecting method according to an embodiment of the present invention.

FIG. 4 is a flowchart of an eye detecting method according to an embodiment of the present invention. The eye detecting method can be performed by the eye detecting apparatus of FIGS. 1 and 2 and is, for ease of explanation, explained with reference to elements of FIGS. 1 and 2. However, it is to be understood that the subject method can be performed by other apparatuses.

Referring to FIGS. 1, 2, and 4, in operation S400, a face image is input to the face image normalizer 100. Here, only a face image is extracted from an image input via an input unit (not shown) of a CCD camera or the like and then the extracted face image is input to the face image normalizer 100. In operation S410, the face image normalizer 100 adjusts the size of the face image to a predetermined size, for example, the size of 80×96 pixels, and normalizes a histogram of the face image. The normalization of the histogram can contribute to calculating a normalized frequency K(i) using Equation 1:

$$K(i) = \frac{g_{max}}{n} \times H(i) \quad (1)$$

wherein i denotes the level of a lightness value within a range between 0 and 255, $g_{max}$ denotes a maximum value of the lightness value, n denotes the total number of pixels, and H(i) denotes an accumulation histogram. The contrast of the face image can be enhanced by normalizing the histogram of the face image.

In operation S420, the face image is divided into left and right images. In the present embodiment, the face image includes 80 pixels in width and thus is divided into the left and right images each having 40 pixels. Here, the division of the face image into the left and right images is to prevent an error from occurring in detecting eyes when illuminations on both sides of the face image are different.

In operation S430, eye candidates are detected from the left and right images. Operation S430 will be described in more detail later with reference to FIG. 5.

In operation S440, the eye candidates are evaluated with respect to each of combinations of the eye candidates using geometric information to select the eye candidates. Here, the geometric information may include distances, slopes, and the like among the eye candidates. If in operation S430, N eye candidates are detected from each of the left and right images, there may be N×N combinations for the left and right images. The eye candidate evaluator 120 determines whether distances and slopes among the eye candidates are proper for the N×N combinations to select eye candidates.

The distances among the eye candidates are determined depending on whether the distances satisfy Equation 2:

$$Th_{distance,1} \leq D_{centers} \leq Th_{distance,2} \quad (2)$$

wherein $D_{centers}$ denotes distances among the centers of eye candidates, $Th_{distance,1}$ denotes a minimum value of the distances of proper eye candidates, and $Th_{distance,2}$ denotes a maximum value of the distances among the proper eye candidates. $Th_{distance,1}$ and $Th_{distance,2}$ are determined through an experiment.

The slopes among the eye candidates are determined depending on whether the slopes satisfy Equation 3:

$$Th_{slope,1} \leq S_{centers} \leq Th_{slope,2} \quad (3)$$

wherein $S_{centers}$ denotes the slopes among the centers of the eye candidates, $Th_{slope,1}$ denotes a minimum value of the slopes among proper eye candidates, and $Th_{slope,2}$ denotes a maximum value of the slopes among the proper eye candidates. $Th_{slope,1}$ and $Th_{slope,2}$ are determined through an experiment.

In operation S450, the eye candidates are verified using an SVM algorithm to detect eyes. Operation S450 will be explained in more detail later with reference to FIG. 6.

Figure 5:
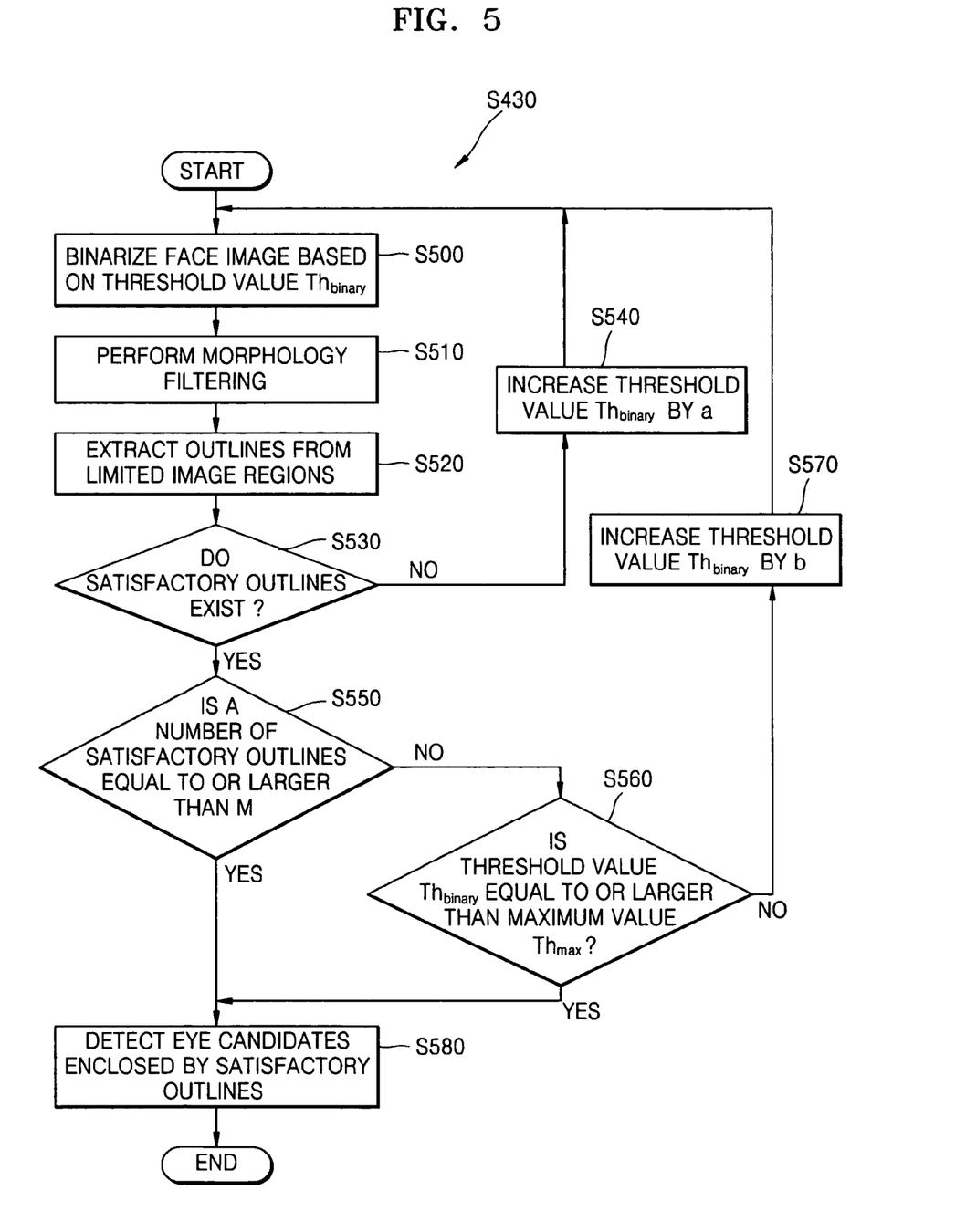
FIG. 5 is a flowchart for explaining of operation S430 of FIG. 4.

Operation S430 performed by the eye candidate detector 110 will now be explained in detail with reference to FIG. 5. In operation S500, a face image is binarized based on a threshold value $Th_{binary}$, which can be defined as in Equation 4.

$$1 \text{ if } g(x,y) \geq Th_{binary}$$

$$0 \text{ if } g(x,y) < Th_{binary} \quad (4)$$

wherein g(x,y) denotes a lightness value of each pixel (x,y) of the face image. The threshold value $Th_{binary}$ is first set to a very small value and increased depending on whether satisfactory outlines of the face image are detected.

In operation S510, morphology filtering is performed. In other words, an erosion operation is performed, and then a dilation operation is carried out to remove noise and soften outlines of black regions.

In operation S520, points with varying values are detected from the binarized face image and dots are marked on coordinates, the surroundings of which have been changed, to detect the outlines. Here, the outlines are detected not from the entire face image but from limited image regions. The limited image regions are determined using a result value obtained through an experiment. In a case where a mean value of the positions of eyes is calculated using the result value of the experiment, rectangular regions having predetermined lengths in length and width based on the mean value may be set to the limited image regions.

In operation S530, a determination is made as to whether the detected outlines include satisfactory outlines. Here, the satisfactory outlines refer to as outlines enclosing eye candidates suitable to be eyes, and whether the outlines are satisfactory may be determined depending on the shape, size, and so on of the outlines. The shape of the outlines can be recognized through $\Delta y/\Delta x$ which is obtained using Equation 5:

$$\frac{\Delta y}{\Delta x} = \frac{y_{max} - y_{min}}{x_{max} - x_{min}} \quad (5)$$

wherein $Y_{max}$ denotes a y value of the highest pixel of pixels of an outline, $Y_{min}$ denotes a y value of the lowest pixel of the pixels of the outline, $x_{max}$ denotes an x value of the rightmost pixel of the pixels of the outline, and $x_{min}$ denotes an x value of the leftmost pixel of the pixels of the outline.

Whether the shape of the outlines is satisfactory may be determined depending on whether $\Delta y/\Delta x$ satisfies Equation 6:

$$Th_{contour,1} \leq \frac{\Delta y}{\Delta x} \leq Th_{contour,2} \quad (6)$$

wherein $Th_{contour,1}$ denotes a minimum value of $\Delta y/\Delta x$ of a satisfactory outline, and $Th_{contour,2}$ denotes a maximum value of $\Delta y/\Delta x$ of the satisfactory outline. $Th_{contour,1}$ and $Th_{contour,2}$ are determined through an experiment.

Whether the size of the outlines is satisfactory is determined depending on whether the number of pixels of an eye candidate determined by an outline satisfies Equation 7:

$$Th_{pixel,1} \leq N_{pixel} \leq Th_{pixel,2} \quad (7)$$

wherein $N_{pixel}$ denotes the number of pixels of an outline of an eye candidate, $Th_{pixel,1}$ denotes a minimum value of the number of pixels of an eye candidate determined by a satisfactory outline, and $Th_{pixel,2}$ denotes a maximum value of the number of pixels of the eye candidate. $Th_{pixel,1}$ and $Th_{pixel,2}$ are determined through an experiment.

In the present embodiment, whether the outlines are satisfactory is determined based on the shape and size of the outlines but may be determined based on other evaluation criteria.

If in operation S530, it is determined that the detected outlines do not include the satisfactory outlines, in operation S540, the threshold value $Th_{binary}$ is increased by a value a. Here, a may be set to an arbitrary value such as one between 8 and 12.

If in operation S530, it is determined that the detected outlines include the satisfactory outlines, in operation S550, a determination is made as to whether a number of satisfactory outlines is equal to or larger than a value M. Here, M may be set to an arbitrary value such as one between 3 and 5. If in operation S550, it is determined that the number of the satisfactory outlines is less than M, in operation S560, a determination is made as to whether the threshold value $Th_{binary}$ is equal to or larger than a maximum value $Th_{max}$. Here, the maximum value $Th_{max}$ may be set to an arbitrary value such as a large value to detect an accurate eye candidate. If in operation S560, it is determined that the threshold value $Th_{binary}$ is less than the maximum value $Th_{max}$, in operation S570, the threshold value $Th_{binary}$ is increased by a value b. Here, b is set to an integer less than a.

If in operation S550, it is determined that the number of the satisfactory outlines is equal to or larger than M or if in operation S560, it is determined that the threshold value $Th_{binary}$ is equal to or larger than the maximum value $Th_{max}$, in operation S580, regions enclosed by extracted satisfactory outlines are detected as eye candidates.

Figure 6:
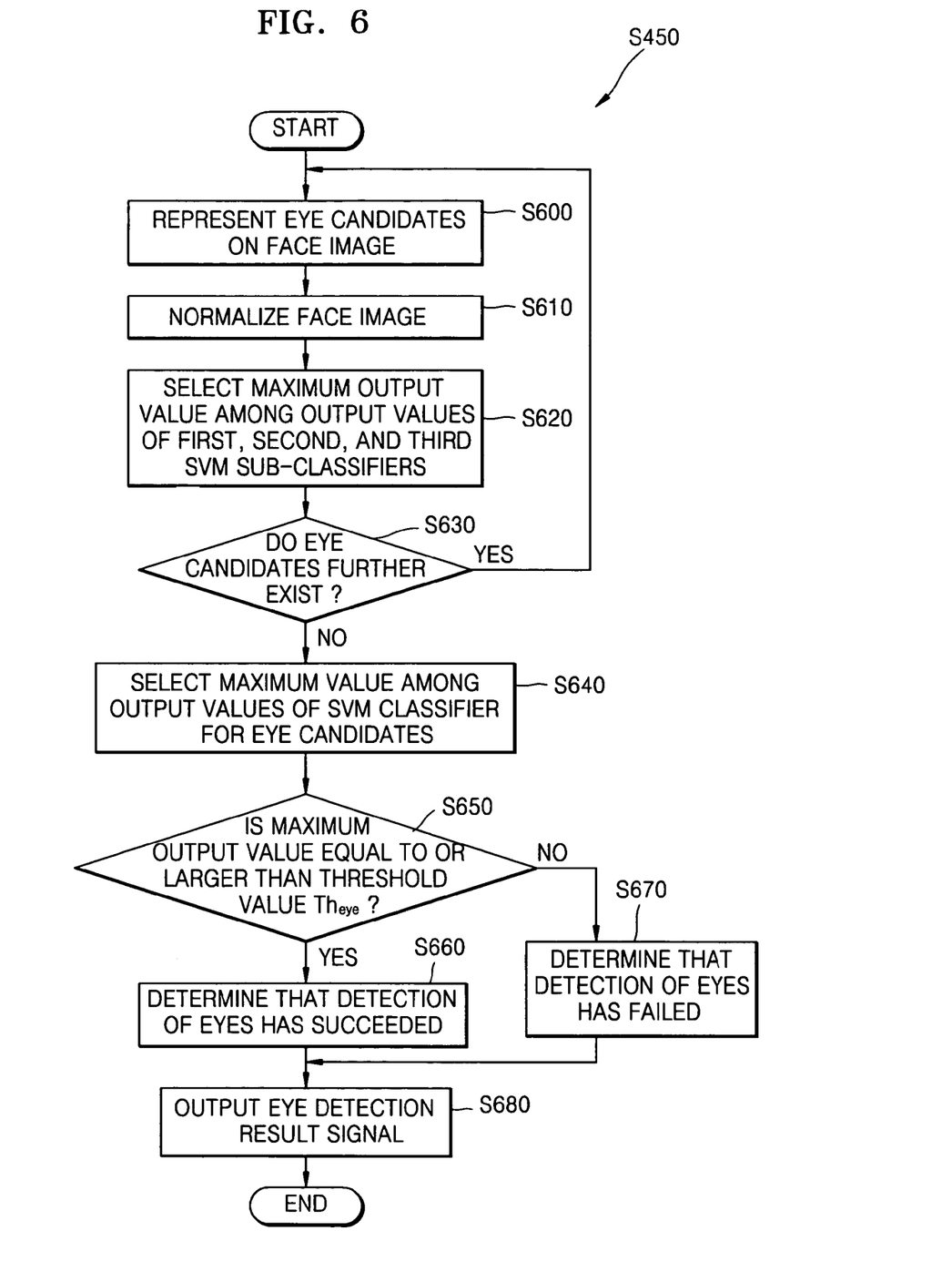
FIG. 6 is a flowchart for explaining operation S450 of FIG. 4.

Operation S450 executed by the eye candidate verifier 130 will now be described in detail with reference to FIG. 6. In operation S600, eye candidates selected by the eye candidate evaluator 120 are represented on the face image. In operation S610, the face image is normalized. In the present embodiment, the face image is normalized to the size of 25×20 pixel.

In operation S610, each pixel of the normalized face image is set to an input vector to select the maximum output value from the output values of the first SVM sub-classifier 131a for the general face, the second SVM sub-classifier 131b for the face wearing the eyeglasses, and the third SVM sub-classifier 131c for the face with the long hair with reference to the learning DB 140. Each of the output values of the first, second, and third SVM sub-classifiers 131a, 131b, and 131c is determined using Equation 8:

$$f(x) = w^T x + b \quad (8)$$

wherein x denotes the input vector, w denotes a weighted vector, and b denotes offset, where w and b are calculated by learning.

In operation S630, a determination is made as to whether other eye candidates exist. If in operation S630, it is determined that other eye candidates exist, the process returns to operation S600 to repeat SVM classification. If in operation S630, it is determined that other eye candidates do not exist, in operation S640, a maximum output value is selected from output values of the SVM classifier 131 for the eye candidates. In operation S650, a determination is made as to whether the maximum output value is equal to or larger than a threshold value $Th_{eye}$. In an SVM classification method, a face image from which eyes are detected is determined as class 1, and a face image from which eyes are not detected is determined class −1. Thus, the threshold value $Th_{eye}$ is generally se to "0" but may be set to a value larger than "0" to increase the accuracy of eye detection. If in operation S650, it is determined that the maximum output value is equal to or larger than the threshold value $Th_{eye}$, in operation S660, it is determined that the detection of eyes has succeeded. If in operation S650, it is determined that the maximum output value is less than the threshold value $Th_{eye}$, in operation S670, the detection of the eyes has failed. In operation S680, an eye detection result signal is output.

As described above, in an eye detecting apparatus and method, according to an embodiment of the present invention, an input face image can be divided into left and right images to detect eye candidates from limited image regions of the left and right images. Also, the detected eye candidates can be evaluated using geometric information and then verified using an SVM algorithm. As a result, eyes can be accurately detected without being less affected by illumination.

Methods of the present invention, including the above-described method according to an embodiment of the present invention, are implementable as computer readable codes on a recording medium accessible by a computer. The recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. An apparatus for detecting eyes, comprising:
an eye candidate detector which divides an input face image into left and right images and detects at least one eye candidate from each of limited image regions of the left and right images by binarizing each of the limited image regions based on threshold values corresponding to each of the limited image regions;
an eye candidate evaluator which evaluates the eye candidates by evaluating each combination of the eye candidates using geometric information as to the eye candidates to filter out eye candidates that cannot be eyes;
a learning database which stores a plurality of face images in which positions of eyes are arranged and a plurality of face images which do not include eyes or in which positions of eyes are not arranged; and
an eye candidate verifier which verifies the eye candidates with reference to the learning database and outputs an eye detection result signal,
wherein the eye candidate verifier includes:
a support vector machine (SVM) classifier which receives from the eye candidate evaluator the face image including the eye candidates and calculates an output value using an SVM algorithm;
a maximum output value selector which selects a maximum output value among the calculated output values; and
an eye determiner which, when the maximum output value is at least equal to a threshold value, determines that the detection of the eyes has succeeded, and when the maximum output value is less than the threshold value, determines that the detection of the eyes has failed, and
wherein the SVM classifier includes:
a first support vector machine sub-classifier which calculates an output value for a general face;
a second support vector machine sub-classifier which calculates an output value for a face with eyeglasses; and
a third support vector machine sub-classifier which calculates an output value for a face with long hair,
wherein the eye candidate detector binarizes the input face image based on a first threshold value, extracts outlines from the limited image regions of the binarized face image, determines whether the outlines are satisfactory based on shapes and sizes of the extracted outlines and, when it is determined that the outlines are not satisfactory outlines, increasing the first threshold by a first value and repeating the binarization of the input face image based on the first threshold value and the extraction of the outlines from the limited image regions of the binarized face image; and detects eye candidates within the satisfactory outlines, and
wherein before the eye candidates within the satisfactory outlines are detected, the detection of the at least one eye candidate from the limited image regions of the left and right images includes, when a number of satisfactory outlines of the extracted outlines is less than a value M, increasing the first threshold value by a second value less than the first value and repeating the binarization of the input face image based on the first threshold value and the extraction of the outlines from the limited image regions of the binarized face image.

2. A method of detecting eyes, comprising:
dividing an input face image into left and right images;
detecting at least one eye candidate from each of limited image regions of the left and right images by binarizing each of the limited image regions based on threshold values corresponding to each of the limited image regions;
evaluating the eye candidates by evaluating each combination of the eye candidates using geometric information as to the eye candidates to filter out eye candidates that cannot be eyes; and
verifying the eye candidates with reference to a learning database storing a plurality of face images in which positions of eyes are arranged and a plurality of face images which do not include eyes or in which positions of eyes are not arranged and outputting an eye detection result signal,
wherein the verifying the at least one eye candidate includes:
representing the at least one eye candidate on the face image;

receiving the face image on which the at least one eye candidate is represented and calculating an output value using a support vector machine (SVM) algorithm;

selecting a maximum output value among the output values for the at least one eye candidate; and determining when the maximum output value is at least equal to a threshold value, that the detection of the eyes has succeeded, and, when the maximum output value is less than a second threshold value, determining that the detection of the eyes has failed, wherein the face image on which the at least one eye candidate is represented is received to select and output the maximum value from an output value for a general face, an output value for a face with eyeglasses, and an output value for a face with long hair, wherein the detecting includes:

binarizing the input face image based on a first threshold value;

extracting outlines from the limited image regions of the binarized face image;

determining whether the outlines are satisfactory based on shapes and sizes of the extracted outlines and, when it is determined that the outlines are not satisfactory outlines, increasing the first threshold by a first value and repeating the binarization of the input face image based on the first threshold value and the extraction of the outlines from the limited image regions of the binarized face image; and detecting eye candidates within the satisfactory outlines, wherein before the eye candidates within the satisfactory outlines are detected, the detecting the at least one eye candidate from the limited image regions of the left and right images includes, when a number of satisfactory outlines of the extracted outlines is less than a value M, increasing the first threshold value by a second value less than the first value and repeating the binarization of the input face image based on the first threshold value and the extraction of the outlines from the limited image regions of the binarized face image, and wherein the method is performed using at least one computer system.

3. The method of claim 2, further comprising, before the dividing, adjusting size of the input face image and normalizing a histogram.

4. The method of claim 2, wherein the detecting includes performing morphology filtering including an erosion operation and then a dilation operation to remove noise and soften outlines of black regions.

5. The method of claim 2, wherein the determining is based on a shape of the outlines, and wherein the shape of the outlines is $\Delta y/\Delta x$ obtained by the following equation:

$$\frac{\Delta y}{\Delta x} = \frac{y_{max} - y_{min}}{x_{max} - x_{min}},$$

wherein $y_{max}$ denotes a y value of the highest pixel of pixels of an outline, $y_{min}$ denotes a y value of the lowest pixel of the pixels of the outline, $x_{max}$ denotes an x value of the rightmost pixel of the pixels of the outline, and $x_{min}$ denotes an x value of the leftmost pixel of the pixels of the outline.

6. The method of claim 5, wherein the shape of the outlines is when $\Delta y/\Delta x$ satisfies the following equation:

$$Th_{contour,1} \leq \frac{\Delta y}{\Delta x} \leq Th_{contour,2},$$

wherein $Th_{contour,1}$ denotes a minimum value of $\Delta y/\Delta x$ of a satisfactory outline, and $Th_{contour,2}$ denotes a maximum value of $\Delta y/\Delta x$ of the satisfactory outline.

7. The method of claim 2, wherein the determining is based on a size of the outlines, and wherein the size of the outlines is satisfactory is determined depending on whether a number of pixels of an eye candidate determined by an outline satisfies the following equation:

$$Th_{pixel,1} \leq N_{pixel} \leq Th_{pixel,2},$$

wherein $N_{pixel}$ denotes the number of pixels of an outline of an eye candidate, $Th_{pixel,1}$ denotes a minimum value of the number of pixels of an eye candidate determined by a satisfactory outline, and $Th_{pixel,2}$ denotes a maximum value of the number of pixels of the eye candidate.

8. The method of claim 2, wherein although the number of the satisfactory outlines is less than M, when the first threshold value is at least equal to a specified maximum value, the detection of the eye candidates within the satisfactory outlines is performed.

9. The method of claim 2, wherein the first value is between 8 and 12.

10. The method of claim 2, wherein M is between 3 and 5.

11. A non-transitory computer-readable storage medium encoded with processing instructions for causing a processor to perform a method of detecting eyes, the method comprising:

dividing an input face image into left and right images;

detecting at least one eye candidate from each of limited image regions of the left and right images by binarizing each of the limited image regions based on threshold values corresponding to each of the limited image regions;

evaluating the eye candidates by evaluating each combination of the eye candidates using geometric information as to the eye candidates to filter out eye candidates that cannot be eyes; and verifying the eye candidates with reference to a learning database storing a plurality of face images in which positions of eyes are arranged and a plurality of face images which do not include eyes or in which positions of eyes are not arranged and outputting an eye detection result signal, wherein the verifying the at least one eye candidate includes:

representing the at least one eye candidate on the face image;

receiving the face image on which the at least one eye candidate is represented and calculating an output value using a support vector machine (SVM) algorithm;

selecting a maximum output value among the output values for the at least one eye candidate; and determining when the maximum output value is at least equal to a threshold value, that the detection of the eyes has succeeded, and, when the maximum output value is less than a second threshold value, determining that the detection of the eyes has failed, and wherein the face image on which the at least one eye candidate is represented is received to select and output the maximum value from an output value for a general face, an output value for a face with eyeglasses, and an output value for a face with long hair, wherein the detecting includes:

binarizing the input face image based on a first threshold value;

extracting outlines from the limited image regions of the binarized face image;

determining whether the outlines are satisfactory based on shapes and sizes of the extracted outlines and, when it is determined that the outlines are not satisfactory outlines, increasing the first threshold by a first value and repeating the binarization of the input face image based on the first threshold value and the extraction of the outlines from the limited image regions of the binarized face image; and detecting eye candidates within the satisfactory outlines, and wherein before the eye candidates within the satisfactory outlines are detected, the detecting the at least one eye candidate from the limited image regions of the left and right images includes, when a number of satisfactory outlines of the extracted outlines is less than a value M, increasing the first threshold value by a second value less than the first value and repeating the binarization of the input face image based on the first threshold value and the extraction of the outlines from the limited image regions of the binarized face image.

* * * * *

UNITED STATES PATENT AND TRADEMARK OFFICE
CERTIFICATE OF CORRECTION

PATENT NO. : 8,457,363 B2
APPLICATION NO. : 11/132211
DATED : June 4, 2013
INVENTOR(S) : Younghun Sung et al.

Page 1 of 1

It is certified that error appears in the above-identified patent and that said Letters Patent is hereby corrected as shown below:

In the Claims:

Column 10, Line 62, In Claim 11, after "eyes has failed," delete "and".

Signed and Sealed this
Eighth Day of October, 2013

Teresa Stanek Rea
*Deputy Director of the United States Patent and Trademark Office*